(12) United States Patent
Tanaka (10) Patent No.: US 11,698,532 B2
(45) Date of Patent: Jul. 11, 2023

(54) IMAGE DISPLAY DEVICE (71) Applicant: Shimadzu Corporation, Kyoto (JP)

(72) Inventor: Masato Tanaka, Kyoto (JP)

(73) Assignee: Shimadzu Corporation, Kyoto (JP)

(*) Notice: Subject to any disclaimer, the term of this patent is extended or adjusted under 35 U.S.C. 154(b) by 0 days.

(21) Appl. No.: 17/256,074

(22) PCT Filed: Jul. 10, 2018

(86) PCT No.: PCT/JP2018/026088
§ 371 (c)(1),
(2) Date: Dec. 24, 2020

(87) PCT Pub. No.: WO2020/012568
PCT Pub. Date: Jan. 16, 2020

(65) Prior Publication Data
US 2021/0271084 A1 Sep. 2, 2021

(51) Int. Cl.
*G02B 27/01* (2006.01)
*F21V 8/00* (2006.01)

(52) U.S. Cl.
CPC ....... *G02B 27/0172* (2013.01); *G02B 6/0035* (2013.01); *G02B 6/0076* (2013.01); *G02B 2027/012* (2013.01); *G02B 2027/0118* (2013.01)

(58) Field of Classification Search
None
See application file for complete search history.

(56) References Cited

U.S. PATENT DOCUMENTS 9,081,178 B2 * 7/2015 Simmonds ......... G02B 27/4211
11,249,237 B2 * 2/2022 Nakamura ........... G02B 27/145
(Continued)

FOREIGN PATENT DOCUMENTS

EP 3018524 A1 5/2016
JP 4508655 B2 5/2010
(Continued)

OTHER PUBLICATIONS

Shinke (Machine Translation of JP-6259157-B1; Jan. 2018 ) (Year: 2018).*

(Continued)

*Primary Examiner* — Michelle R Connelly
(74) *Attorney, Agent, or Firm* — Muir Patent Law, PLLC (57) ABSTRACT

In an image display device in which two light guides are combined, flat plates (16, 17) of the same material as that of a substrate (11) of a first light guide (10) is affixed to the outsides of a first surface (11a) and a second surface (11b) of the substrate (11), the first surface (11a) and the second surface (11b) opposing each other. Image light introduced into the substrate (11) is reflected by an incident-side reflective surface (12) toward exit-side reflective surface (13a to 13f), which are half mirrors, and a part of the image light is reflected in stages by the respective exit-side reflective surfaces (13a and 13f) and the remainder of the image light is transmitted. The image light reflected by the exit-side reflective surfaces (13a to 13f) is emitted through the second flat plate (17) and introduced into a second light guide. The part of the image light reflected by the incident-side reflective surface (12) reaches the interface between the first surface (11a) and the first flat plate (16), but enters the flat plate (16) without being reflected, and hits and is absorbed by a light-absorbing sheet (18). This reduces the occurrence of stray light and improves the visibility of a virtual image displayed before user's eyes.

15 Claims, 5 Drawing Sheets

(56) References Cited

U.S. PATENT DOCUMENTS

| | | | |
|---|---|---|---|
| 2008/0198471 A1* | 8/2008 | Amitai | G02B 27/0081 |
| | | | 359/630 |
| 2016/0154243 A1* | 6/2016 | Aiki | G02B 27/0172 |
| | | | 359/633 |
| 2016/0357013 A1 | 12/2016 | Watanabe et al. | |
| 2016/0370582 A1 | 12/2016 | Watanabe | |
| 2018/0203237 A1* | 7/2018 | Shih | G02B 27/106 |
| 2019/0064518 A1* | 2/2019 | Danziger | G02B 6/0036 |
| 2021/0278668 A1* | 9/2021 | Shih | G02B 27/0172 |

FOREIGN PATENT DOCUMENTS

| | | | | |
|---|---|---|---|---|
| JP | 5299391 | B2 | 6/2013 | |
| JP | 5698297 | B2 | 2/2015 | |
| JP | 2015-172713 | A1 | 10/2015 | |
| JP | 2017-167568 | A1 | 9/2017 | |
| JP | 2017-198962 | A1 | 11/2017 | |
| JP | 6259157 | B1 * | 1/2018 | |
| WO | 01/95027 | A2 | 12/2001 | |
| WO | 03/081320 | A1 | 10/2003 | |
| WO | WO-2005059601 | A1 * | 6/2005 | ....... B32B 17/10018 |
| WO | 2011/024291 | A1 | 3/2011 | |
| WO | 2018065975 | A1 | 4/2018 | |

OTHER PUBLICATIONS

Nishida (Machine Translation of WO 2005 029601 A1; Jun. 2005) (Year: 2005).*

Extended European Search Report dated May 27, 2021 for the corresponding European Patent Application No. 18926038.3.

Written Opinion by the International Search Authority for PCT application No. PCT/JP2018/026088, dated Oct. 9, 2018, submitted with a machine translation.

First Office Action dated May 25, 2022 issued for the corresponding European Patent Application No. 18926038.3.

* cited by examiner

IMAGE DISPLAY DEVICE

TECHNICAL FIELD

The present invention relates to an image display device for displaying image information as a virtual image before user's eyes. The present invention is suitable for an image display device, such as, e.g., a helmet-mounted display, a head-up display, a glasses-type display (so-called "smart glasses").

BACKGROUND ART

In automobiles and trains, a head-up display is used in which an image displayed on a display element, such as, e.g., a liquid crystal display (LCD), is projected onto a windshield or a combiner to reflect it back to a driver to form a display image by a virtual image before the eyes of the driver. Further, in airplanes, a helmet-mounted display is used in which an image is projected onto a combiner provided on a helmet worn by a pilot on the head to form a display image by a virtual image before the eyes of the pilot by a similar mechanism. Recently, a spectacle type head-mounted display called a smart glass or a head-mounted type head-mounted display or the like has also begun to become widespread.

Figure 5:
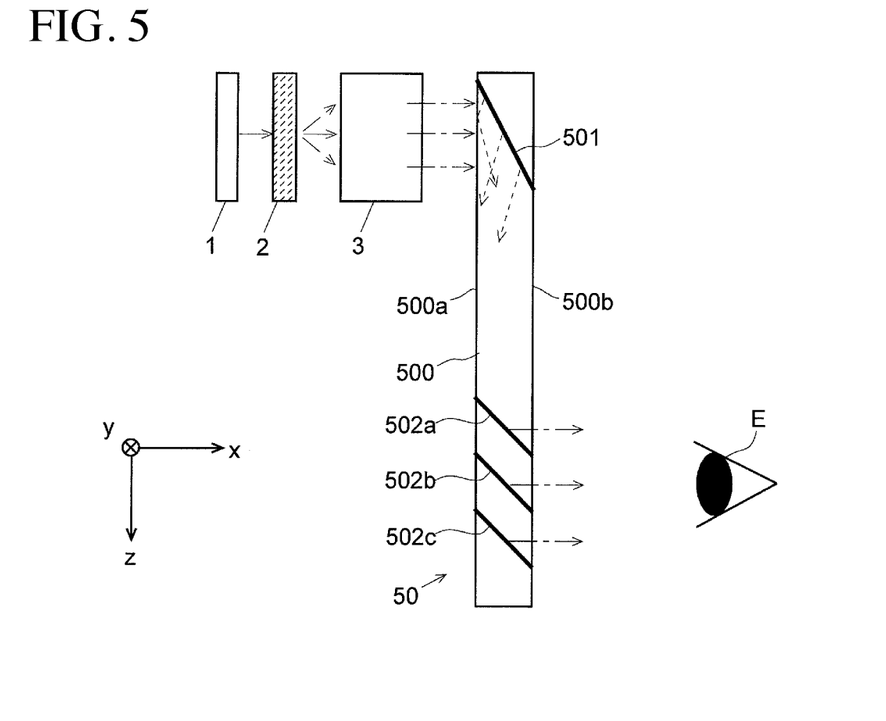
FIG. 5 is a schematic configuration diagram of an optical system according to an example of a conventional image display device.

Various types of image display devices are known as an optical system for displaying a virtual image before the user's eyes, and one of them is a system using a light guide (light guide plate). FIG. 5 is a schematic optical path diagram of an example of a conventional image display device using a light guide disclosed in Patent Documents 1, 2, etc. For the convenience of explanation here, the x-axis, the y-axis, and the z-axis perpendicular to each other are defined as shown in the figure.

This image display device is provided with a light source 1, a display element 2, a collimating optical system 3, and a light guide 50. Here, the display element 2 is a transmissive liquid crystal display element, and the light source 1 is a backlight light source for a so-called transmissive liquid crystal display element. The light emitted from the light source 1 illuminates the display element 2 from its back side, and the light (hereinafter referred to as "image light") including the image formed on the display surface of the display element 2 as information is emitted from the display element 2. The collimating optical system 3 is configured to introduce the image light emitted from the respective points (pixels) on the display surface of the display element 2 into the light guide 50 as substantially parallel light rays. Thus, the light introduced from the collimating optical system 3 into the light guide 50 is a set of parallel light rays containing the information on different portions of the image formed on the display surface of the display element 2 and incident on the light guide 50 at different angles.

The light guide 50 includes a transparent substrate 500 of the flat cube shape having a first surface 500a and a second surface 500b, both parallel to the y-z plane and facing each other, and a third surface and a fourth surface (present on the front side and the far side of the paper) and not shown, both parallel to the x-z plane. Inside the substrate 500, a single incident-side reflective surface 501 and a plurality of first to third (three in this embodiment) exit-side reflective surfaces 502a to 502c are formed. The incident-side reflective surface 501 is perpendicular to the third surface and the fourth surface and is inclined with respect to the first surface 500a and the second surface 500b. The plurality of exit-side reflective surfaces 502a to 502c is also perpendicular to the third surface and the fourth surface and is inclined with respect to the first surface 500a and the second surface 500b and is parallel to each other. Here, the incident-side reflective surface 501 is a reflective surface (ideally a total reflection surface) by a mirror or the like. On the other hand, the exit-side reflective surfaces 502a to 502c each are a partially reflective surface, i.e., a beam splitter or a half mirror that reflects a part of the illuminated light and transmits the remainder thereof.

As described above, the image light containing the information of the different portions of the image formed on the display surface of the display element 2 is incident on the inside of the substrate 500 of the light guide 50 at different angles as parallel light rays and is reflected by the incident-side reflective surface 501. The reflected light rays are transmitted through substrate 500 while being repeatedly reflected by the first surface 500a and the second surface 500b and reach the first exit-side reflective surface 502a. The first exit-side reflective surface 502a reflects a part of the image light that has arrived and transmits the remainder thereof. The transmitted image light reaches the next second exit-side reflective surface 502b, a part of the light is reflected and the remainder thereof is transmitted. The same applies to the third exit-side reflective surface 502c. Therefore, a part of the image light transmitted through the inside of the substrate 500 of the light guide 50 is sequentially reflected by the plurality of exit-side reflective surfaces 502a to 502c, respectively, and is transmitted through the second surface 500b to the outside of the substrate 500. The image light reflected by the respective exit-side reflective surfaces 502a to 502c is incident on the user's eyes E at the respective predetermined angles.

As described above, in the image display device, the image formed on the display surface of the display element 2 is displayed before the user's eyes as a virtual image. The substrate 500 of the light guide 50 is transparent and the exit-side reflective surfaces 502a to 502c each are a partially reflective surface. Therefore, the user can view the forward scenery through the light guide 50. That is, this image display device is a see-through type image display device, and can display an arbitrary virtual image by superimposing on a forward scene.

The above-described image display device uses a single light guide, but an image light configuration in which two light guides are combined so that the overall propagation direction of the image light is substantially perpendicular is also known conventionally.

For example, in the image display device described in Patent Document 3, the image light introduced into the first light guide is almost completely reflected by the incident-side reflective surface in the same manner as the image light in the light guide shown in FIG. 5, then reaches the exit-side reflective surface, which is a partially reflective surface, while being repeatedly reflected between the two opposing surfaces of the substrate, and is emitted from the first light guide. The emitted image light is introduced into the substrate of the second light guide in contact with the first light guide and is almost totally reflected by the incident-side reflective surface provided in the substrate of the second light guide. Then, the reflected image light propagates while being repeatedly reflected by the two opposing surfaces of the substrate of the second light guide and is emitted from the second light guide by being partially reflected by the exit-side reflective surface. Then, the image light is incident on the user's eyes.

By combining the two light guides in this way, it is possible to enlarge the virtual image by the image light emitted from the display element in two axes direction perpendicular to each other and display it before the user's eyes. Hereinafter, in this specification, the image display device using a plurality of light guides is simply referred to as an image display device.

There are various optical path configurations for a light guide. Other than the light guide described above in which the image light is repeatedly reflected by the opposing two surfaces of the substrate, a light guide is also known in which only the image light is used, the image light being propagated straight through the substrate, reached a partially reflective surface of the exit-side reflective surface, and taken out to the outside of the substrate by being reflected by the exit-side reflective surface (hereinafter referred to as "rectilinear propagation light guide"). When such rectilinear propagation light guide is used as a first light guide of an image display device, the optical system can be miniaturized because of the following reasons. In cases where the image light is reflected between the opposing surfaces of the substrate, the optical path is long and the angular light rays are expanded, which enlarges the optical system. On the other hand, in cases where the rectilinear propagation light guide is used, the optical path is short, which can suppress the spread of such light rays.

PRIOR ART DOCUMENT

Patent Document

Patent Document 1: Japanese Patent No. 4,508,655
Patent Document 2: Japanese Patent No. 5,698,297
Patent Document 3: WO 2011/024291
Patent Document 4: Japanese Patent No. 5,299,391

SUMMARY OF THE INVENTION

Problems to be Solved by the Invention

However, the image display device with a rectilinear propagation light guide as a first light guide as described above has the following problems. In the rectilinear propagation light guide, it is necessary to guide the image light substantially totally reflected by the incident-side reflective surface formed in the substrate to the exit-side reflective surface so that the image light does not hit the two opposing surfaces of the substrate as much as possible. Therefore, as compared with the light guide in which the image light is propagated by utilizing the repetitive reflections, it is necessary for the rectilinear propagation light guide to increase the thickness of the substrate. Even in such a configuration, a part of the image light substantially totally reflected by the incident-side reflective surface may hit the first surface or the second surface of the substrate. In this case, the image light larger in the incident angle with respect to the first surface and the second surface of the substrate is reflected by these surfaces, and the reflected light is reflected by the exit-side reflective surface to be emitted from the first light guide. The light emitted at this time is different in the emission direction (angle) from the light reflected by the exit-side reflective surface without being hit to the first surface or the second surface in the substrate of the first light guide to be emitted. Therefore, such light may become stray light, causing a ghost image, which in turn may deteriorate the visibility of the virtual image.

The present invention has been made to solve the above-described problems, and its main object is to reduce generation of stray light in a first light guide to improve visibility of a virtual image displayed before user's eyes in an image display device using a rectilinear propagation light guide as the first light guide.

Means for Solving the Problem

The present invention made to solve the above-described problem relates to an image display device for displaying a virtual image before user's eyes. The image display device includes:

a) an image emitting unit including a display portion for forming two-dimensional image information, the image emitting unit being configured to form parallel light rays different in an angle at each part on an image and cause the parallel light rays to be incident on a first light guide to be described later as image light;

b) the first light guide including a transparent substrate, an incident portion for guiding the image light to an inside of the substrate, and an emitting portion for emitting the image light guided to the inside of the substrate by the incident portion and propagated in the substrate to an outside of the substrate; and c) a second light guide including a transparent substrate having a first surface facing an outer surface of the substrate of the first light guide on a side where the image light is emitted by the emitting portion of the first light guide and a second surface opposing the first surface, an incident portion for guiding the image light emitted from the first light guide to an inside of the substrate of the second light guide, and an emitting portion for guiding the image light to the user's eyes, the image light being guided by the incident portion of the second light guide and propagated in the substrate of the second light guide while being reflected by the first surface and the second surface of the substrate of the second light guide, wherein a reflection suppressing portion configured to prevent or reduce a reflection of light from the inside of the substrate of the first light source is provided at a portion of at least one surface of the substrate of the first light guide where there is a possibility that the image light guided by the incident portion of the first light guide to the inside of the substrate reaches first without being reflected even once.

The incident portion of the above-described first and second light guides is a reflective surface of a mirror or the like provided on an inside or a surface of a substrate, a holographic element of, e.g., a volume holographic diffraction grating or the like, or a refractive surface provided on a surface of a substrate for bending a propagation direction of light. On the other hand, the emitting portion in the first and second light guides is a partially reflective surface of, e.g., a beam splitter or a half mirror, or a holographic element of, e.g., a volume holographic diffraction grating.

In the present invention, the image emitted from the image emitting unit is finally incident on the user's eyes through the inside of the substrate of the first light guide and the inside of the substrate of the second light guide. With this, a virtual image containing two-dimensional image information is formed before the user's eyes. Most of the light image introduced into the inside of the substrate by the incident portion of the first light guide propagates straight to the emitting portions without being hit to the interface between the substrate and the outside (region outside the substrate) and is taken out to the outside from the substrate by being, for example, reflected by the emitting portions. The image light taken out from the first light guide is incident on the second light guide.

In a case where the incident portion of the first light guide is, for example, a reflective surface, depending on the hitting position of the reflective surface, there is a possibility that the image light reflected by the reflective surface hits a part of the interface of the substrate before reaching the emitting portion. In the first light guide of the image display device according to the present invention, a reflection suppressing portion is provided at the portion of the interface of the substrate where there is a possibility that the image light hits. Therefore, the image light that hits the reflection suppressing portion from the inside of the substrate enters the reflection suppressing portion without being reflected. The reflection suppressing portion may be roughly classified into a case in which a material having transparency (or translucency) the same as or equivalent to that of the substrate of the light guide is used, and a case in which a material having a function of absorbing light is used. In the latter case, the image light that reached the interface of the substrate will be absorbed without being reflected, so that there is little image light that is reflected by the interface of the substrate interface to reach the emitting portion. Further, in the former case, there is a possibility that the image light that reached the outside interface (the interface opposite to the substrate side of the first light guide) is reflected by the interface and returned to the inside of the substrate. However, the reflection position is shifted to the side closed to the emitting portion by the amount of the reflection suppressing portion. Therefore, as compared with the case where no reflection suppressing portion is provided, the amount of the reflected light returning to the inside of the substrate is greatly reduced.

When the image light is incident on the first light guide from the image emitting unit, the light emitted from one portion on the image (i.e., the light having the same image information) is incident substantially parallel to each other on the first light guide. Therefore, the image light having the same image information guided to the inside of the substrate from the incident portion toward the emitting portion also propagates substantially parallel to each other and reaches the emitting portion without being reflected even once during the propagation, and the image light taken out from the substrate by the emitting portion (hereinafter referred to as "regular image light") is also substantially parallel. On the other hand, the image light that reaches the emitting portion by being reflected by the interface of the substrate in the middle of being propagated from the incident portion to the emitting portion is incident on the emitting portion at an angle different from the normal image light that reaches the emitting portion without being reflected in the middle of being propagated from the incident portion to the emitting portion. Therefore, the image light taken out by the emitting portion becomes stray light that propagates in a direction different from the direction of the normal image light.

As described above in the present invention, since the reflection suppressing portion is provided, the image light reflected in the middle of reaching the emitting portion from the incident portion is almost eliminated or reduced than in a conventional device. Therefore, it is possible to eliminate or reduce the stray light emitted from the first light guide. Further, even in a case where the image light reached the reflection suppressing portion in the middle of reaching from the incident portion to the emitting portion and reflected by the outer interface of the reflection suppressing portion is incident on the second light guide as stray light, the stray light is spatially separated from the regular image light arrived directly from the incident portion of the first light guide to the emitting portion and taken out by the emitting portion. Consequently, the stray light eventually does not reach the user's eyes, or is not overlapped with the virtual image formed by the normal image light. The stray light caused by the reflection at the reflection suppressing portion substantially does not interfere with the visibility of the target virtual image. As a result, it is possible to improve the visibility of the virtual image displayed before the user's eyes through the second light guide.

As described above, in the present invention, the above-described reflection suppressing portion may take various configurations. Specifically, the reflection suppressing portion may have a function of transmitting light hitting at such a large incident angle that a conventional interface reflects the light arrived from the inside of the substrate. That is, as the reflection suppressing portion, a plate member may be used in which it is made of a transparent material having a refractive index equal to or close to that of the substrate and shaped to closely affixed to the outer surface of the substrate.

Further, the above-described transparent plate member is not always required to be closely affixed to the outer surface of the substrate of the first light guide. In this case, a gap between the plate member and the substrate is filled with a fluid, such as, e.g., a liquid, having a refractive index close to that of both the plate member and the substrate. The reflection suppressing portion may be configured by the combination of the fluid and the plate member.

In such a reflection suppressing portion, the light hitting the interface of the substrate from the emitting portion of the first light guide at a relatively small incident angle passes through the interface to enter the inside of the plate member and further passes through the outside interface of the plate member to be transmitted to the outside. Therefore, in this instance, the reflection suppressing portion may be provided on the introduction path of the image light from the first light guide to the second light guide.

The above-described reflection suppressing portion may be a member having a function of absorbing light while suppressing light reflections and scattering. Such a member is exemplified by an anti-reflection agent to be applied to the surface of the substrate and a light-absorbing sheet to be applied to the surface of the substrate.

Such a member absorbs the light that hits the interface of the substrate from the emitting portion of the first light guide at a relatively small incident angle. Therefore, it is necessary to provide the reflection suppressing portion to avoid the introduction path of the image light from the first light guide to the second light guide. In addition, needless to say, such a reflection suppressing portion prevents the incident of the light from the outside to the substrate of the light guide, and therefore it is necessary to provide the reflection suppressing portion to avoid the portion of the first light guide where the image light is incident from the image emitting unit.

In the present invention, preferably, the emitting portion of the first light guide is composed of a plurality of partially reflective surfaces, and the reflection suppressing portion having a function of absorbing light is provided at a portion where there is a possibility that the image light transmitted through the partially reflective surface positioned farthest from the incident portion among the plurality of partially reflective surfaces reaches. This makes it possible to further reduce stray light emitted from the first light guide, which is more beneficial for improving the visibility of the virtual image displayed before the user's eyes.

Effects of the Invention

According to the present invention, it is possible to reduce the generation of a ghost image or the like in the virtual image displayed before the user's eyes, which in turn can display an image with high visibility.

EMBODIMENTS FOR CARRYING OUT THE INVENTION

Figure 1:
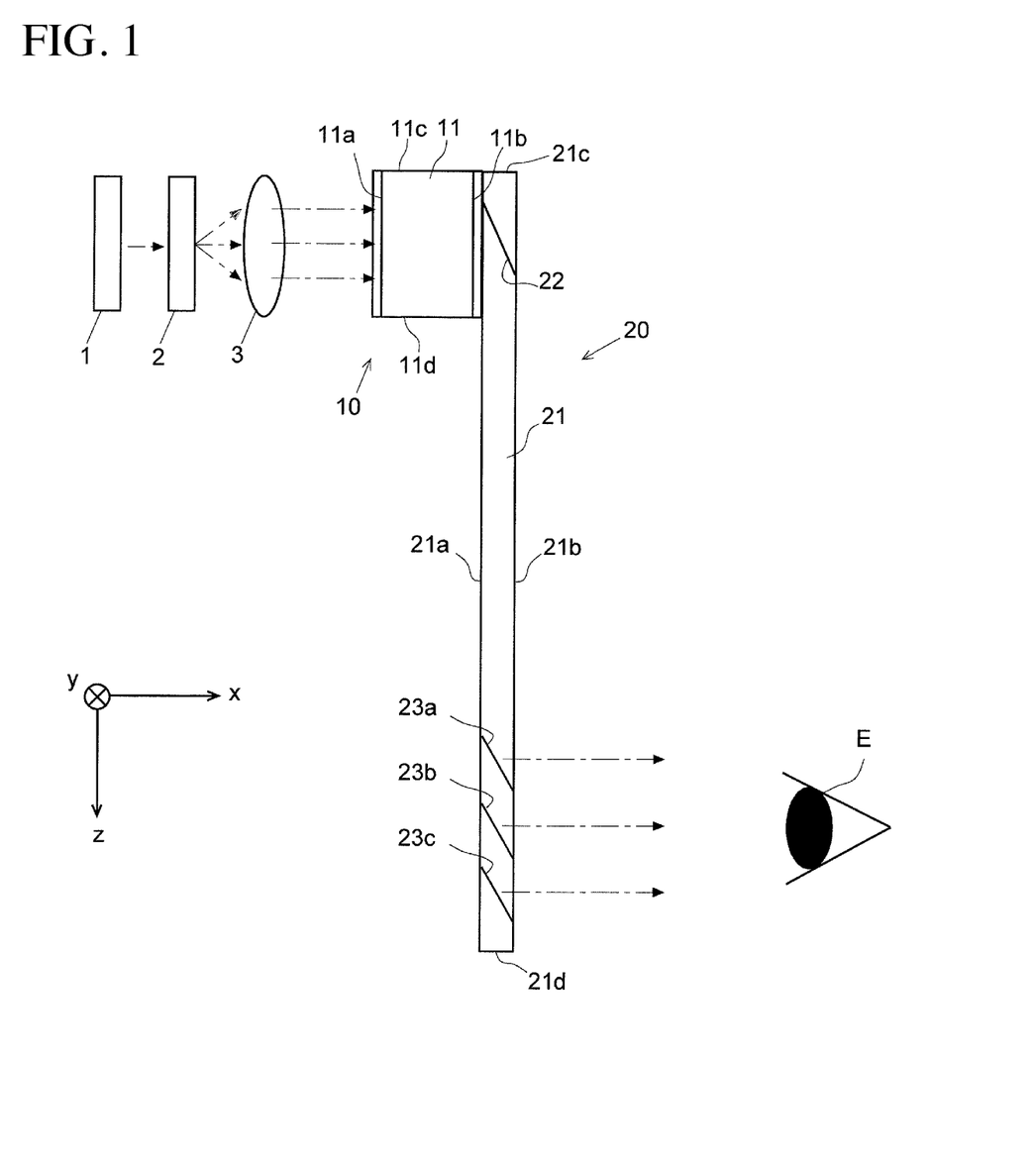
FIG. 1 is a schematic configuration diagram when an optical system of an image display device according to an example of the present invention is viewed from the side (in the y-axis direction).
Figure 2:
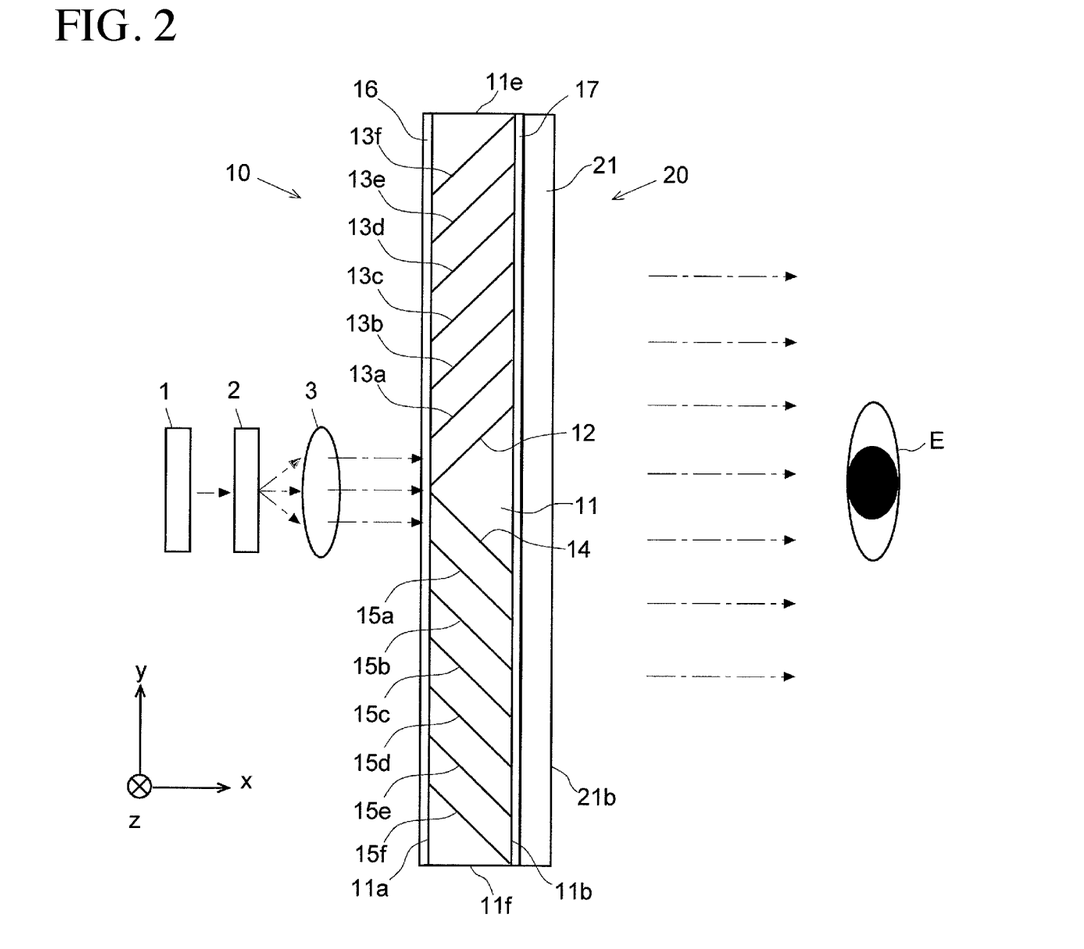
FIG. 2 is a schematic configuration diagram when the optical system of the image display device of the example is viewed from directly above (in the z-axis direction).
Figure 3:
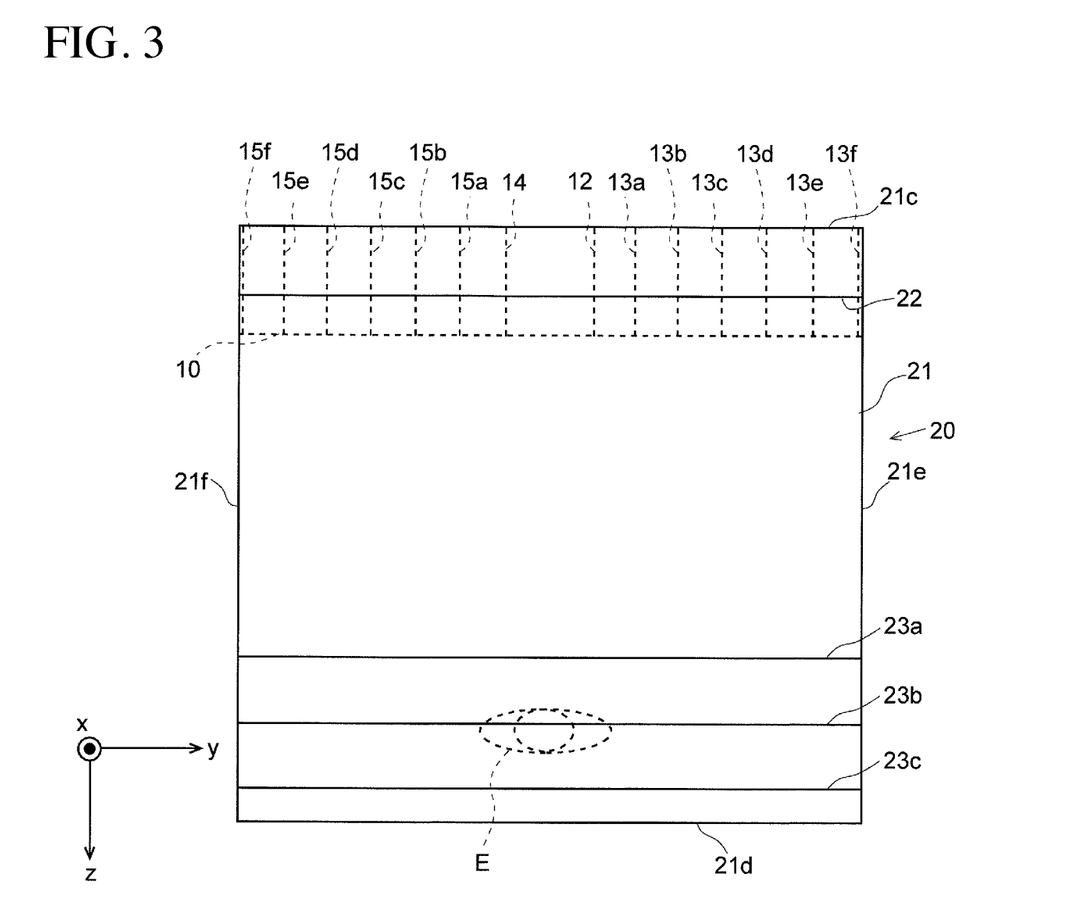
FIG. 3 is a schematic configuration diagram when the optical system of the image display device of the example is viewed from a user side.
Figure 4:
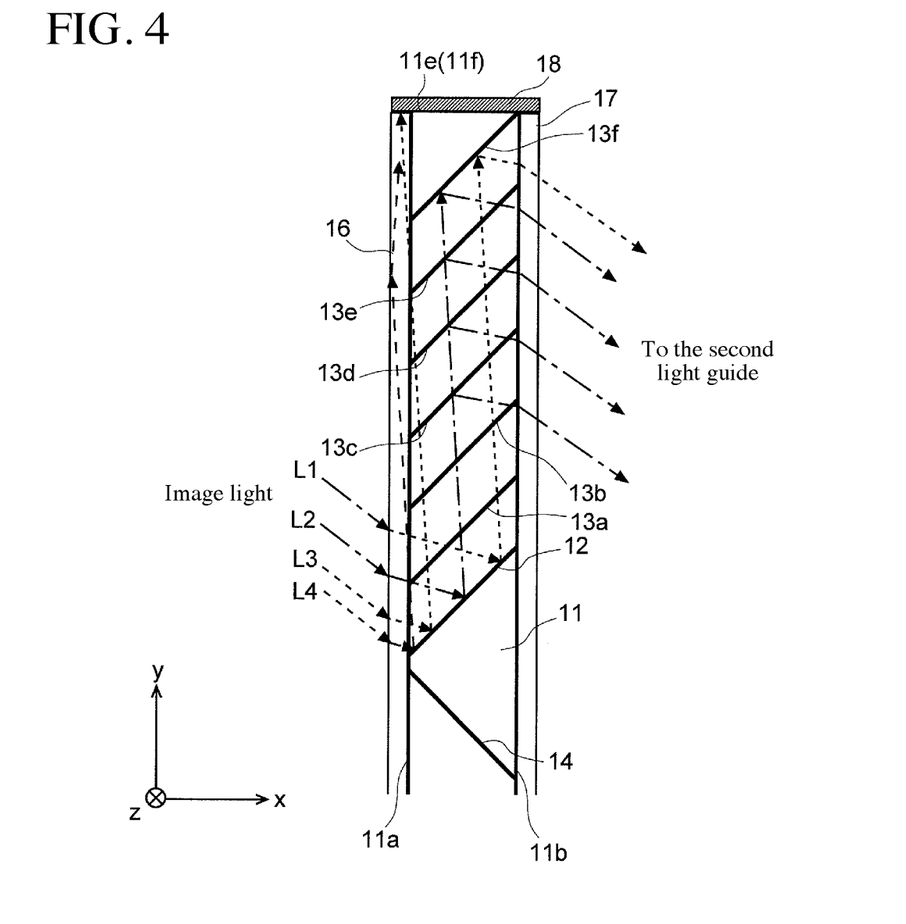
FIG. 4 is a detailed optical path configuration diagram of an inside of a substrate of a first light guide in the state of FIG. 2.

An image display device, which is an embodiment of the present invention, will be described with reference to the attached drawings. FIG. 1 is a schematic configuration diagram when an optical system of an image display device of this example is viewed from the side (in the y-axis direction). FIG. 2 is a schematic configuration diagram when the optical system is viewed from directly above (in the z-axis direction). FIG. 3 is a schematic configuration diagram when the optical system is viewed from the user side. Further, FIG. 4 is a detailed optical path configuration diagram in the substrate of the first light guide in the state of FIG. 2.

The image display device of this example is provided with a light source 1, a display element 2, a collimating optical system 3, a first light guide 10, and a second light guide 20. The light source 1, the display element 2, and the collimating optical system 3 correspond to the image emitting unit in the present invention. The same image emitting unit composed of the light source 1, the display element 2, and the collimating optical system 3 in the conventional image display device described in FIG. 5 may be used, but is not limited thereto. For example, as the display element 2, instead of a transmissive liquid crystal display element, a reflective liquid crystal display element, an organic EL display, a DMD (digital macro mirror device), a MEMS mirror, a projector, or the like, may be used.

In cases where a reflective liquid crystal display element or a DMD is used as the display element 2, as the light source 1, a light source that illuminates the liquid crystal display element or the DMD from the front side is used. Further, in cases where a self-emitting display element, such as, e.g., an organic EL display, is used as the display element 2, it can be considered that the light source 1 is incorporated in the display element 2. Further, in cases where a MEMS mirror for scanning an angle is used as the display element 2, a laser light source for emitting a thin laser light toward the MEMS mirror is used as the light source 1, and the collimating optical system 3 is omitted, or it is sufficient to use the collimating optical system 3 to finely tune the parallel light. Also, in the case of using a projector for imaging, the light source 1 can be considered as a projector and the display element 2 can be considered as a projector screen.

The first light guide 10 is a member having a substantially cubic shape elongated in the y-axis direction as a whole, and is provided with a substrate. The substrate has a first surface 11a and a second surface 11b that are both parallel to the y-z plane and opposed away from each other in the x-axis direction, a third surface 11c and a fourth surface 11d that are both parallel to the x-y plane and opposed away from each other in the z-axis direction, and a fifth surface 11e and a sixth surface 11f that are parallel to the x-z plane and opposed away from each other in the y-axis direction. The substrate 11 is a transparent member made of, for example, polycarbonate resin or quartz glass. In the substrate 11, a single incident-side reflective surface 12, 14 and a plurality of exit-side reflective surfaces 13a to 13f, 15a to 15f (six in this example) are formed substantially symmetrically across the x-z plane substantially at the center of the length in the y-axis direction.

The incident-side reflective surface 12, 14 is perpendicular to the third surface 11c and the fourth surface 11d and is inclined at a predetermined angle with respect to the first surface 11a and the second surface 11b. Further, a plurality of exit-side reflective surfaces 13a to 13f, and 15a to 15f are similarly vertical to the third surface 11c and the fourth surface 11d, respectively, and are inclined at a predetermined angle with respect to the first surface 11a and the second surface 11b. The plurality of exit-side reflective surfaces 13a to 13f, 15a to 15f are arranged in parallel. The incident-side reflective surface 12, 14 is a reflective surface (preferably total reflection surface) by a mirror or the like, and the exit-side reflective surfaces 13a to 13f, and 15a to 15f each are a partially reflective surface having a predetermined reflectance property (transmission property).

To each of the first surface 11a and the second surface 11b of the substrate 11 of the first light guide 10, a flat plate 16, 17 of a predetermined thickness made of the same material as the substrate 11 (i.e., the same refractive index) is affixed. Note that the material of the flat plate 16, 17 is not required to be the same as that of the substrate 11 as long as the refractive index is the same as or close to that of the substrate 11. A light-absorbing sheet 18 for absorbing light is affixed to each of the fifth surface 11e and the sixth surface 11f of the substrate 11.

The second light guide 20 is a generally flat plate-shaped member extending in the y-z plane and is provided with a substrate 21. The substrate 21 has a first surface 21a and a second surface 21b both parallel to the y-z plane and opposed away from each other in the x-axis direction, a third surface 21c and a fourth surface 21d both parallel to the x-y plane and opposed away from each other in the z-axis direction, and a fifth surface 21e and a sixth surface 21f both parallel to the x-z plane and opposed away from each other in the y-axis direction. As with the substrate 11, the substrate 21 is a transparent body of, e.g., polycarbonate resin or quartz glass. Inside the substrate 21, a single incident-side reflective surface 22 and a plurality of (three in this embodiment) exit-side reflective surfaces 23a to 23c are formed.

The incident-side reflective surface 22 is perpendicular to the fifth surface 21e and the sixth surface 21f and is inclined at a predetermined angle with respect to the first surface 21a and the second surface 21b. Also, a plurality of exit-side reflective surfaces 23a to 23c are similarly perpendicular to the fifth surface 21e and the sixth surface 21f, respectively, and is inclined at a predetermined angle with respect to the first surface 21a and the second surface 21b. The plurality of exit-side reflective surfaces 23a to 23c are arranged in parallel to each other. The incident-side reflective surface 22 is a reflective surface (preferably a total reflection surface) by a mirror or the like, and the exit-side reflective surfaces 23a to 23c are a partially reflective surface having a predetermined reflectance property (transmission property).

In the image display device of this example, image light is formed by the display element 2 by receiving the illumination light from the light source 1. This image light is substantially collimated by the collimating optical system 3 and is introduced to the inside of the substrate 11 of the first light guide 10 through the first flat plate 16. The image light introduced from the collimating optical system 3 to the first light guide 10 is a set of parallel light rays that contain information of different parts of the two-dimensional image formed on the display surface of the display element 2 and is incident on the first light guide 10 at different angles. Since the flat plate 16 and the substrate 11 are equal in the refractive index, the image light incident on the flat plate 16 at a predetermined incident angle with respect to the flat plate 16 as shown in FIG. 4 is refracted at the outer surface of the flat plate 16 and then propagates straightly at the interface between the flat plate 16 and the substrate 11 to be introduced to the inside of the substrate 11.

Now, focusing on the approximately half range of the substrate 11 shown in FIG. 4, most of the image light is reflected by the incident-side reflective surface 12 in the substrate 11, propagates the inside of the substrate 11 toward the plurality of exit-side reflective surfaces 13a to 13f, and reaches the exit-side reflective surface 13a closest to the incident-side reflective surface 12. The exit-side reflective surface 13a reflects a part of the arrived light rays and transmits the remainder. The transmitted light reaches the subsequent exit-side reflective surface 13b. A part of the light rays are reflected and the remainder are transmitted. The same applies to the subsequent exit-side reflective surface 13c to 13f. Therefore, the light rays propagating straight through the inside of the substrate 11 of the first light guide 10 are reflected by the plurality of exit-side reflective surfaces 13a to 13f, respectively, and are transmitted through the second flat plate 17 provided on the outside of the second surface 11b of the substrate 11 to be emitted to the outside. Similarly, in a substantially half of the opposite side of the substrate 11 not visible in FIG. 4, the light rays reflected by the incident-side reflective surface 14 of the first light guide 10 and propagated straight through the inside of the substrate 11 of the first light guide 10 are reflected by the plurality of exit-side reflective surfaces 15a to 15f, respectively, and are emitted to the outside through the second flat plate 17. The emitted light is normal image light.

As shown in FIG. 4, light rays L1, L2, L3, and L4 containing the same image information (of course, this is a part of rays, and there are many other light rays containing the same image information) are incident on the first light guide 10 substantially in parallel. The light rays hit the incident-side reflective surface 12 at the same incident angle. However, depending on the hitting position, although most of the image light reflected by the incident-side reflective surface 12 (light rays L1 and L2 in FIG. 4) reaches the exit-side reflective surfaces 13a to 13f directly, some image light (light rays L3 and L4 in FIG. 4) hits the first surface 11a of the substrate 11. The incident angle when the image light hits the first surface 11a is large. Therefore, if it is in a state in which there is no first plate 16, the image light is reflected by the first surface 11a and returns to the inside of the substrate 11. The image light reflected by the first surface 11a hits the exit-side reflective surface 13a to 13f at an incident angle different from that of the light rays L1, L2 coming straight from the incident-side reflective surface 12 and is therefore emitted from the first light guide 10 in a direction different from the direction of the light rays L1, L2, resulting in stray light.

In contrast, in the image display device of this example, the image light (e.g., the light rays L3, L4) hitting the first surface 11a from the inside of the substrate 11 passes through the first surface 11a and enters the inside of the first flat plate 16 as depicted in FIG. 4, and is reflected at the interface when hitting the outer interface of the first flat plate 16 (e.g., the light ray L4). As shown by the light ray L3 in FIG. 4, the image light that propagated in the first flat plate 16 and reached the light-absorbing sheet 18 as it is absorbed by the light-absorbing sheet 18. Even in cases where the light-absorbing sheet 18 is not provided, the image light passes through the fifth surface 11e of the substrate 11 and exits to the outside as it is. That is, it is possible to prevent light rays which are incident on the second light guide 20 as stray light by reaching any one of the exit-side reflective surfaces 13a to 13f in a case where there is no first flat plate 16 from being transmitted to the second light guide 20.

On the other hand, as shown by the light ray L4 in FIG. 4, the image light propagated in the first flat plate 16 and reflected by the outer interface of the first flat plate 16 may return to the inside of the substrate 11 depending on the position, etc., where it is reflected, or the returned light may be emitted as stray light from the first light guide 10. However, even in such cases, since the reflected position of the image light is shifted to the rear side (the side closer to the fifth surface 11e) by the amount propagated in the first flat plate 16, the stray light derived from the reflected light will be spatially separated from the regular image light containing the image information.

Thus, even in a case where the image light reflected by the incident-side reflective surface 12 progresses to reach the first surface 11a from the inside of the substrate 11, the amount of light to be returned to the inside of the substrate 11 by the reflection is reduced as compared with the case where there is no first flat plate 16. Further, even in a case where a part of the image light is returned to the inside of the substrate 11 by the reflection at the outer interface of the first flat plate 16, the reflected light and the regular image light are spatially separated. This results in less stray light being mixed to the image light exiting the first light guide 10, and the stray light is spatially well separated from the normal image light.

The image light ejected from the first light guide 10 is introduced into the substrate 21 of the second light guide 20 through a first surface 21a of the second light guide 20 disposed proximate to the outer surface of the second flat plate 17. Then, after being reflected generally in the z-axis direction by the incident-side reflective surface 22 of the second light guide 20, the image light propagates while being reflected between the first surface 21a and the second surface 21b, and reaches the exit-side reflective surfaces 23a to 23c. Then, the image light is reflected by the exit-side reflective surfaces 23a to 23c and is emitted from the second light guide 20 toward the user's eyes E. As a result, the light rays introduced into the substrate 21 of the second light guide 20 are enlarged in the x-axis direction and emitted from the substrate 21, and an image formed on the display surface of the display element 2 is displayed as a virtual image before the user's eyes E.

The reduced stray light emitted from the first light guide 10 and introduced into the second light guide 20 improves the clarity of the virtual image displayed before the user's eyes, making it easier to read, for example, characters. Further, even in cases where there exists stray light emitted from the first light guide 10 and introduced into the second light guide 20, the stray light and the normal image light are spatially separated as described above. For this reason, in a state in which the line of sight of the user is oriented to see the virtual image (normal image), no stray light is visually recognized by the user, or even if the stray light is visible, the stray light hardly overlaps the normal image. Thus, such stray light does not interfere with the visibility of the regular image.

Note that a very small part of the image light transmitted through the exit-side reflective surface 13f, 15f at the final stage in the first light guide 10 will be absorbed by being hit the light-absorbing sheet 18, so that the image light is prevented from returning to the inside of the substrate 11 by scattering, diffused reflection, or the like. This can also further reduce stray light to be emitted together with the image light from the first light guide 10. However, the light-absorbing sheet 18 is not essential.

Further, in the configuration of the optical system of the image display device of this example described above, there is almost no possibility that the image light reflected by the incident-side reflective surface 12, 14 hits the second surface 11b of the substrate 11 as it is. Therefore, the second flat plate 17 is not necessarily required and may be omitted.

Further, in the first surface 11a of the substrate 11, there is not always a possibility that the entire surface of the first surface 11a is hit by the image light reflected by the incident-side reflective surface 12. Therefore, the first flat plate may be provided only at the portion where there is a possibility that the image light hits as it is. That is, the flat plate 16, 17 for suppressing the image light reflections by the first surface 11a and the second surface 11b of the substrate 11 in the first light guide 10 may be provided on one or both of the first surface 11a and the second surface 11b, or may be provided on only a part of the surface of the first surface 11a and the second surface 11b instead of the entire surface. Which range of which surface the reflective plate portion of the member, etc., corresponding to the above-described flat plate 16, 17 should be provided depends on the relation between the incident angle of the light rays and the emission angle (i.e., the arrangement angle of these reflective surfaces) in the incident-side reflective surface 12, 14 and the exit-side reflective surface 13a to 13f, 15a to 15f, or the configuration of the optical system, such as, e.g., the thickness of the substrate 11.

Further, in the above-described example, although the flat plate 16, 17 made of a transparent material adhered to the outer surface of the substrate 11 is served as a reflection suppressing portion, the configuration of the reflection suppressing portion is not limited thereto. For example, a coating layer or a light-absorbing sheet layer formed by applying an anti-reflection coating material or the like with a predetermined thickness to the surface (interface with the outside) of the substrate 11 may be used. However, since such a member originally shields the light to be transmitted, the member needs to be provided only in a portion except for a portion where the image light is introduced into the substrate 11 of the first light guide 10 and a portion where the image light is emitted from the inside of the substrate to the outside of the first light guide 10.

Further, in the image display device according to the present invention, the number of the exit-side reflective surfaces provided in the light guide 10 and 20 is arbitrarily determined as long as the number is plural. Further, a hologram surface, such as, e.g., a reflective volume hologram grating, may be used in place of the exit-side reflective surface. As the incident portion for guiding the image light to the inside of the substrate 11, 21 of the light guide 10, 20, instead of the reflective surface formed inside the substrate 11, 21, a hologram surface, such as, e.g., a reflective volume hologram grating, may be used. Further, it may be configured such that a part of the first surface 11a of the substrate 11 of the light guide 10 is set to be non-parallel to the second surface 11b so that the non-parallel surface (the interface between the substrate 11 and the outer side) may be used as a reflection surface that reflects the image light.

Further, in the image display device of the above-described example, although the opposing planes of the first light guide 10 are parallel planes, these planes are not required to be parallel to each other. Further, although both the opposing planes of the second light guide 20 are parallel planes, other planes except for the first surface 21a and the second surface 21b need not be parallel to each other.

It should be noted that the above-described example is merely an example of the present invention, and is not limited to the various modified examples described above, and it is needless to say that it is encompassed by the scope of the present claims even if it is changed, modified, or added as appropriate within the scope of the present invention.

DESCRIPTION OF SYMBOLS

1: Light source
2: Display element
3: Collimating optical system
10: First light guide
11: Substrate
11a: First surface
11b: Second surface
11c: Third surface
11d: Fourth surface
11e: Fifth surface
11f: Sixth surface
12, 14: Incident-side reflective surface
13a to 13f, 15a to 15f: Exit-side reflective surface
16: First flat plate
17: Second flat plate
20: Second light guide
21: Substrate
21a: First surface
21b: Second surface
21c: Third surface
21d: Fourth surface
21e: Fifth surface
21f: Sixth surface
22: Incident-side reflective surface
23a to 23c: Exit-side reflective surface
E: User's eye

The invention claimed is:

1. An image display device for displaying a virtual image before a user's eyes, the image display device comprising:
   a) an image emitting unit including a display portion for forming two-dimensional image information, the image emitting unit being configured to form parallel light rays different in an angle at each part on an image and cause the parallel light rays to be incident on a first light guide to be described later as image light;
   b) the first light guide including a first transparent substrate having two opposing surfaces, a first incident portion for guiding the image light to an inside of the first transparent substrate, and a first emitting portion for emitting the image light guided to the inside of the first transparent substrate by the first incident portion and propagated in the first transparent substrate to an outside of the first transparent substrate, the first incident portion and the first emitting portion being formed in the first transparent substrate;

c) a second light guide including a second transparent substrate having a first surface facing one of the two opposing surfaces of the first transparent substrate of the first light guide on a side where the image light is emitted by the first emitting portion of the first light guide and a second surface opposing the first surface, a second incident portion for guiding the image light emitted from the first light guide to an inside of the second transparent substrate of the second light guide, and a second emitting portion for guiding the image light to the user's eyes, the image light being guided by the second incident portion of the second light guide and propagated in the second transparent substrate of the second light guide while being reflected by the first surface and the second surface of the second transparent substrate of the second light guide; and a reflection suppressing portion, wherein the reflection suppressing portion is configured to prevent or reduce a reflection of light from the inside of the first transparent substrate of the first light guide, and is provided at a portion of at least one surface of the first transparent substrate of the first light guide, such that some light from inside of the first transparent substrate of the first light guide enters the reflection suppressing portion and light reflecting into the first transparent substrate of the first light guide is reduced or prevented, and wherein the first light guide is a rectilinear propagation light guide in which light exiting the first light guide to the second light guide consists of light propagated through the first transparent substrate after being guided by the first incident portion, reaching the first emitting portion without repeatedly being reflected by the two opposing surfaces of the first transparent substrate, and being taken out to the outside of the first transparent substrate.

2. The image display device as recited in claim 1, wherein the reflection suppressing portion is a plate member made of a transparent material having a refractive index equal to or close to that of the first transparent substrate of the first light guide and is adhered to an outer surface of the first transparent substrate.

3. The image display device as recited in claim 2, wherein the first emitting portion of the first light guide is composed of a plurality of partially reflective surfaces, and wherein the reflection suppressing portion has a function of absorbing the image light transmitted through one of the plurality of partially reflective surfaces positioned farthest from the first incident portion among the plurality of partially reflective surfaces.

4. The image display device as recited in claim 2, wherein the refractive index of the first transparent substrate of the first light guide is equal to the refractive index of the transparent material included in the plate member.

5. The image display device as recited in claim 4, wherein no gap is formed between the first transparent substrate of the first light guide and the transparent material of the plate member.

6. The image display device as recited in claim 1, wherein the reflection suppressing portion includes a transparent plate member having a refractive index that is the same as or close to that of the first transparent substrate of the first light guide, and a fluid filled in a gap between the transparent plate member and the first transparent substrate, the fluid having a refractive index that is the same as or close to refractive indexes of both the transparent plate member and the first transparent substrate.

7. The image display device as recited in claim 6, wherein the refractive index of the first transparent substrate of the first light guide is equal to the refractive index of the transparent material included in the transparent plate member.

8. The image display device as recited in claim 1, wherein the reflection suppressing portion is a member having a function of absorbing light while suppressing a reflection and a scattering of light.

9. The image display device as recited in claim 1, wherein the reflection suppressing portion is formed on the first surface of the second transparent substrate of the second light guide.

10. The image display device as recited in claim 9, further comprising:

a light absorbing sheet covering a third surface of the first transparent substrate of the first light guide, the third surface being perpendicular to the first surface and the second surface of the second transparent substrate of the second light guide.

11. An image display device for displaying a virtual image before a user's eyes, the image display device comprising:

a) an image emitting unit including a display portion for forming two-dimensional image information, the image emitting unit being configured to form parallel light rays different in an angle at each part on an image and cause the parallel light rays to be incident on a first light guide to be described later as image light;

b) the first light guide including a first transparent substrate, a first incident portion for guiding the image light to an inside of the first transparent substrate, and a first emitting portion for emitting the image light guided to the inside of the first transparent substrate by the first incident portion and propagated in the first transparent substrate to an outside of the first transparent substrate;

c) a second light guide including a second transparent substrate having a first surface facing an outer surface of the first transparent substrate of the first light guide on a side where the image light is emitted by the first emitting portion of the first light guide and a second surface opposing the first surface, a second incident portion for guiding the image light emitted from the first light guide to an inside of the second transparent substrate of the second light guide, and a second emitting portion for guiding the image light to the user's eyes, the image light being guided by the second incident portion of the second light guide and propagated in the second transparent substrate of the second light guide while being reflected by the first surface and the second surface of the second transparent substrate of the second light guide; and a reflection suppressing portion, wherein the reflection suppressing portion is configured to prevent or reduce a reflection of light from the inside of the first transparent substrate of the first light guide, and is provided at a portion of at least one surface of the first transparent substrate of the first light guide, such that some light from inside of the first transparent substrate of the first light guide enters the reflection suppressing portion and light reflecting into the first transparent substrate of the first light guide is reduced or prevented, wherein the first light guide is a rectilinear propagation light guide, and the first incident portion and the first emitting portion are formed in the first transparent substrate, and, wherein the reflection suppressing portion is formed on the first surface of the second transparent substrate of the second light guide.

12. The image display device as recited in claim 11, wherein the first emitting portion of the first light guide is composed of a plurality of partially reflective surfaces, and wherein the reflection suppressing portion has a function of absorbing the image light transmitted through one of the plurality of partially reflective surfaces positioned farthest from the first incident portion among the plurality of partially reflective surfaces.

13. The image display device as recited in claim 11, wherein the reflection suppressing portion is a plate member made of a transparent material having a refractive index equal to or close to that of the first transparent substrate of the first light guide and is adhered to an outer surface of the first transparent substrate, and wherein the refractive index of the first transparent substrate of the first light guide is equal to the refractive index of the transparent material included in the plate member.

14. An image display device for displaying a virtual image before a user's eyes, the image display device comprising:

a) an image emitting unit including a display portion for forming two-dimensional image information, the image emitting unit being configured to form parallel light rays different in an angle at each part on an image and cause the parallel light rays to be incident on a first light guide to be described later as image light;

b) the first light guide including a first transparent substrate, a first incident portion for guiding the image light to an inside of the first transparent substrate, and a first emitting portion for emitting the image light guided to the inside of the first transparent substrate by the first incident portion and propagated in the first transparent substrate to an outside of the first transparent substrate;

c) a second light guide including a second transparent substrate having a first surface facing an outer surface of the first transparent substrate of the first light guide on a side where the image light is emitted by the first emitting portion of the first light guide and a second surface opposing the first surface, a second incident portion for guiding the image light emitted from the first light guide to an inside of the second transparent substrate of the second light guide, and a second emitting portion for guiding the image light to the user's eyes, the image light being guided by the second incident portion of the second light guide and propagated in the second transparent substrate of the second light guide while being reflected by the first surface and the second surface of the second transparent substrate of the second light guide; and a reflection suppressing portion, wherein the reflection suppressing portion is configured to prevent or reduce a reflection of light from the inside of the first transparent substrate of the first light guide, and is provided at a portion of at least one surface of the first transparent substrate of the first light guide, such that some light from inside of the first transparent substrate of the first light guide enters the reflection suppressing portion and light reflecting into the first transparent substrate of the first light guide is reduced or prevented, wherein the first light guide is a rectilinear propagation light guide, and the first incident portion and the first emitting portion are formed in the first transparent substrate, and, wherein the reflection suppressing portion includes a transparent plate member having a refractive index that is the same as or close to that of the first transparent substrate of the first light guide, and a fluid filled in a gap between the transparent plate member and the first transparent substrate, the fluid having a refractive index that is the same as or close to refractive indexes of both the transparent plate member and the first transparent substrate.

15. The image display device as recited in claim 14, wherein the refractive index of the first transparent substrate of the first light guide is equal to the refractive index of the transparent material included in the transparent plate member.

\* \* \* \* \*